June 1, 1965  J. C. ECK  3,186,953
PURIFICATION OF AQUEOUS CUPROUS CHLORIDE CATALYST
Filed Nov. 21, 1961
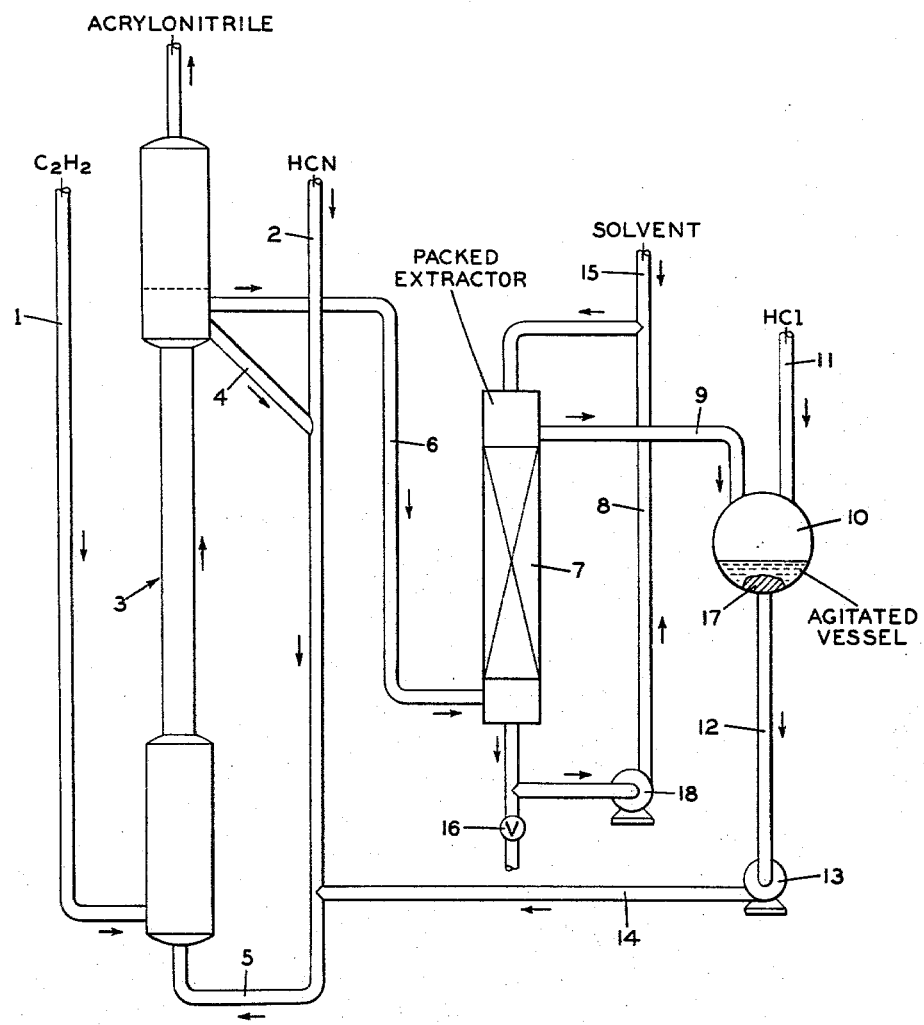
INVENTOR
JOHN C. ECK
BY
*F. Kumpf*
ATTORNEY United States Patent Office 3,186,953
Patented June 1, 1965

3,186,953
PURIFICATION OF AQUEOUS CUPROUS
CHLORIDE CATALYST
John C. Eck, Convent, N.J., assignor to Allied Chemical Corporation, New York, N.Y., a corporation of New York
Filed Nov. 21, 1961, Ser. No. 153,800
5 Claims. (Cl. 252—414)

This invention relates to an improvement in the purification of or the reactivation of catalysts used in the production of acrylonitrile by the reaction of acetylene with hydrogen cyanide.

The production of acrylonitrile by the reaction of acetylene and hydrogen cyanide in the presence of an aqueous cuprous chloride catalyst is described in U.S Patents 2,322,696, 2,486,659, 2,733,259, and many others.

The preferred catalyst mixture suitable for such use consists of a mixture of cuprous chloride, ammonium chloride, copper powder, hydrochloric acid and water. Other catalyst mixtures include a mixture of potassium and sodium chloride in place of the ammonium chloride.

The active ingredient in the catalyst solution is monovalent copper. Cuprous chloride is the most convenient source of the monovalent copper and is relatively insoluble in water. It is therefore customary to add ammonium chloride to solubilize the cuprous chloride as a cuprous ammonium chloride complex. Hydrochloric acid is added in relatively small amounts to bring the catalyst completely into solution. It is, however, important to control the concentration of hydrochloric acid. While small amounts depress the formation of vinyl acetylene, larger amounts cause the formation of vinyl chloride. Hydrochloric acid also influences the equilibrium between the hydrogen-cyanide complex and the hydrogen cyanide itself. Metallic copper is added to the catalyst solution in order to reduce any divalent copper which may be present.

The reaction conditions prevailing in the system in which acrylonitrile is formed from acetylene and hydrogen cyanide in the presence of the aqueous cuprous chloride catalyst also lead to the formation of a small amount of by-product tar which deposits on suspended catalyst present and prevents this suspended catalyst from dissolving in the solution. This in turn decreases its effectiveness. Control of the decreasing efficiency of the catalyst and the necessity to regenerate the catalyst are factors which play an important part in determining the commercial success of the operation.

A number of methods have been proposed for the recovery of the copper values from the spent catalyst or for reactivating the catalyst by first driving off the water, then heating the dried mass to a temperature at which the tar contaminants are converted to solid carbonaceous material which can then be removed by filtration after the catalyst is again taken up in water.

While the methods of the prior art may be effective, they are cumbersome and expensive.

It is accordingly an object of this invention to provide a method of removing these tarry by-products from the catalyst solution which is effective, cheap, and simple.

It is a further object of this invention to provide a method which will permit the efficiency of the catalyst solution to be continuously maintanied without periodic reactivation.

It has been found that these objects and other advantages incidental thereto can be obtained by extraction of part of the catalyst solution with a halogenated hydrocarbon.

The drawings illustrate a preferred manner of carrying out the process.

The halo-hydrocarbons which have been found to be adapted for such use include the following: trichloroethane, trichloroethylene, tetrachloroethane, tetrachloroethylene, 1,4-dichlorobutane, 2,2'-dichlorodiethyl ether, dichloropentane, chlorobenzene, ortho-dichlorobenzene, and other high boiling chlorinated hydrocarbon solvents.

In general, the solvents which are preferred for use in removing the tarry products from the catalyst suspension have the following characteristics:

(1) They should be relatively insoluble in water;
(2) Should not react with hydrochloric acid;
(3) Should have a boiling point above 90° C.; and
(4) Should preferably have a specific gravity which is considerably higher or considerably lower than that of the catalyst solution.

It is preferable to use a solvent having a high specific gravity since the undissolved portion of the catalyst on which the tarry product is dispersed would tend to settle even with agitation. Under these circumstances, a heavy solvent would have a greater chance to extract tarry by-products from the catalyst.

It is desirable that the solvent having a boiling point above 90°, for if any of the solvent is carried back into the reactor along with the catalyst, it would not be distilled out through the exit gas lines along with the acrylonitrile product but would remain in the catalyst solution where it would not be harmful.

With the aid of these solvents it is possible, in accordance with this invention, to remove the tarry by-products which are dispersed on the suspended catalyst. By this means the efficiency of the catalyst is maintained and its life prolonged.

In one method for the production of acrylonitrile by the reaction of acetylene and hydrogen cyanide in the presence of an aqueous cuprous chloride catalyst, the hydrogen cyanide and acetylene are continuously fed through the suspended catalyst solution. The materials are usually fed in in such proportions that the acetylene is in excess. The acrylonitrile which is formed by the reaction of the acetylene with the hydrogen cyanide is usually taken off at the top of the reactor as a vapor along with some unreacted feed materials. The acrylonitrile is separated from these discharged vapors and the unreacted gases, mainly acetylene, are returned to the catalyst solution along with fresh feed.

In accordance with a preferred embodiment of this invention, means are provided toward the bottom of the reactor for continuously or intermittently taking off a part of the catalyst solution. This solution is then fed to a vessel where it is brought into intimate contact with one of the high-boiling halogenated hydrocarbons. As the hydrocarbon comes into intimate contact with the suspended catalyst, it will dissolve and take off the tarry by-product. The halo-hydrocarbon and catalyst solution are then separated by decantation whereupon the treated catalyst solution can either be returned to the reactor or fed to another vessel wherein it may be treated with a mineral acid such as hydrochloric to bring the solution to an optimum pH value. It is then preferable, but not necessary, to expose the treated solution to copper powder. This will help maintain the copper present in the solution in the cuprous state. Thereupon the catalyst solution can be fed back into the reactor wherein the acrylonitrile synthesis is taking place.

The method is probably best exemplified by reference to the drawings which are used here to help describe an example of the manner of carrying out the process. Acetylene is fed to the bottom of reaction chamber 3 through feed pipe 1. As the gaseous acetylene passes therethrough, it comes into intimate contact with a catalyst mixture in which the components are present in the following weight ratios: 650 parts of cuprous chloride, 8 parts of copper powder, 20 parts of concentrated hydrochloric acid (specific gravity 1.18) and 560 parts of water. As the gaseous acetylene bubbles through the catalyst solution, it promotes a circulatory action causing the solution to flow downward through leg 4 of the reactor and come into contact with HCN which is being fed into the system through feed pipe 2. An intimate mixture of HCN, acetylene, and catalyst solution results. The admixed solutions continue their circulatory motion downward through leg 5 and back to the reactor chamber 3. This causes a maximum amount of hydrogen cyanide to be present at that point where the acetylene enters the reaction chamber through feed pipe 1. Approximately 5 percent of the reaction mixture in the reactor 3 is continuously tapped through flow arm 6 at a rate such that the volume in packed extractor 7 is maintained at 1–10 percent of the volume in the reactor chamber 3. Tetrachloroethylene is cycled counter-currently through extractor 7 and leg 8 with the aid of pump 18 in such manner as to extract by-products produced in the reaction which took place in reactor 3 and were fed to the bottom of extractor 7 via flow arm 6. The extracted reaction mixture leaves extractor 7 by means of take off arm 9 and passes to agitated vessel 10 which contains solid copper metal. A bleed off valve is provided at 16 to permit the removal of contaminated solvent which is replaced with fresh solvent at 15. Concentrated aqueous hydrochloric acid is continually added to the catalyst solution at inlet 11 in vessel 10 in order to maintain the pH of the solution at 1 to 2. The purified catalyst solution is subsequently removed via pipe 12 under the influence of pump control 13 and is then fed back to the reaction chamber through pipe 14 and leg 5 of the reactor 3 where it again is used in the production of acrylonitrile.

It can readily be seen that the above-described method readily lends itself to either continuous or intermittent treatment of the catalyst solution and that by the constant removal of the tarry by-product from the catalyst solution, it is possible to greatly prolong its effective life.

Although certain preferred embodiments of the invention have been disclosed for purpose of illustration, it will be evident that various changes and modifications may be made therein without departing from the scope and spirit of the invention.

I claim:

1. The method of maintaining the efficiency of an aqueous cuprous chloride catalyst used in the production of acrylonitrile from acetylene which comprises withdrawing part of the catalyst solution from the acrylonitrile reactor, extracting tarry by-products in said solution with a halogenated hydrocarbon, separating the catalyst solution from the halo-hydrocarbon and returning the catalyst solution to the acrylonitrile.

2. The method of maintaining the efficiency of an aqueous cuprous chloride catalyst used in the production of acrylonitrile from acetylene which comprises withdrawing part of the catalyst solution from the acrylonitrile reactor, extracting tarry by-products in said solution with at least one material selected from the group consisting of trichloroethane, trichloroethylene, tetrachloroethane, tetrachloroethylene, 1,4-dichlorobutane, 2,2'-dichlorodiethyl ether, dichloropentane, chlorobenzene, ortho-dichlorobenzene, separating the catalyst solution from the halo-hydrocarbon and returning the catalyst solution to the acrylonitrile reactor.

3. The method of maintaining the efficiency of an aqueous cuprous chloride catalyst used in the production of acrylonitrile from acetylene according to claim 2 wherein tetrachloroethylene is the halo-hydrocarbon solvent.

4. The method of maintaining the efficiency of an aqueous cuprous chloride catalyst used in the production of acrylonitrile from acetylene according to claim 2 wherein the separated catalyst solution is treated to adjust its pH to the optimum value and is exposed to copper powder to maintain the copper therein in a cuprous state, and the so treated solution is returned to the acrylonitrile reactor.

5. The method of maintaining the efficiency of an aqueous cuprous chloride catalyst used in the production of acrylonitrile from acetylene according to claim 2 wherein tetrachloroethylene is cycled counter-currently through an extractor to extract tarry by-products produced in the acrylonitrile reactor.

References Cited by the Examiner

UNITED STATES PATENTS

| 1,915,152 | 6/33 | Calcott et al. | 252—415 |
| 2,479,884 | 8/49 | West et al. | 252—415 |
| 2,649,418 | 8/53 | Stehman | 252—414 |

MAURICE A. BRINDISI, *Primary Examiner.*